(12) United States Patent
Yagawa

(10) Patent No.: US 8,988,244 B2
(45) Date of Patent: Mar. 24, 2015

(54) ARTICLE TRANSFER SYSTEM

(75) Inventor: Kenji Yagawa, Ashiya (JP)

(73) Assignee: Daifuku Co., Ltd., Osaka (JP)

( * ) Notice: Subject to any disclaimer, the term of this patent is extended or adjusted under 35 U.S.C. 154(b) by 203 days.

(21) Appl. No.: 13/585,117

(22) Filed: Aug. 14, 2012

(65) Prior Publication Data

US 2013/0207811 A1 Aug. 15, 2013

(30) Foreign Application Priority Data

Sep. 6, 2011 (JP) ................................. 2011-194221

(51) Int. Cl.
| | |
|---|---|
| G08B 3/00 | (2006.01) |
| B60R 25/10 | (2013.01) |
| B66B 5/06 | (2006.01) |
| G09G 5/00 | (2006.01) |
| G06T 15/50 | (2011.01) |
| G06F 11/00 | (2006.01) |
| G08B 23/00 | (2006.01) |
| B65G 1/04 | (2006.01) |

(52) U.S. Cl.
CPC .............. G08B 23/00 (2013.01); B65G 1/0421 (2013.01)
USPC .............. 340/691.6; 340/426.24; 340/539.22; 340/571; 340/520; 345/618; 345/1.1; 345/581; 345/594; 345/698; 187/396; 187/286; 187/314; 702/188

(58) Field of Classification Search
USPC ............. 340/691.6, 426.24, 539.22; 345/618, 345/1.1
See application file for complete search history.

(56) References Cited

U.S. PATENT DOCUMENTS

| | | | | |
|---|---|---|---|---|
| 6,128,017 | A * | 10/2000 | Alimpich et al. .............. 715/808 |
| 2002/0075288 | A1 * | 6/2002 | Matsumura et al. ........... 345/690 |
| 2007/0043539 | A1 * | 2/2007 | Niina et al. .................... 702/188 |
| 2012/0050782 | A1 * | 3/2012 | Kawasaki .................... 358/1.14 |

FOREIGN PATENT DOCUMENTS

| | | | |
|---|---|---|---|
| JP | 200372910 A | | 3/2003 |
| JP | 2003072910 A | * | 3/2003 |

* cited by examiner

Primary Examiner — Fekadeselassie Girma
(74) Attorney, Agent, or Firm — The Webb Law Firm

(57) ABSTRACT

An article transfer system that allows the operator to easily notice that abnormality occurs in an abnormality detecting sensor for detecting abnormality and perform remedial work is provided. The article transfer system is adapted to display information indicating that the abnormality occurs on a display device as abnormality occurrence information, receive input of a result of determination by the operator on whether or not the abnormality indicated by the abnormality occurrence information occurs, and display information indicating that the detecting information received from the abnormality detecting sensor is incorrect on the display device when the operator inputs the result of determination that the abnormality indicated by the abnormality occurrence information does not occur with the abnormality detecting sensor detecting the abnormality.

8 Claims, 5 Drawing Sheets

1

ARTICLE TRANSFER SYSTEM

FIELD OF INVENTION

The present invention relates to an article transfer system including an article transporting device for transporting an article, an abnormality detecting sensor for detecting abnormality of the article transporting device or a target point to which the article is transferred by the article transporting device, an abnormality determination section for determining whether or not any abnormality occurs based on detecting information received from the abnormality detecting sensor, and a display control section for displaying information indicating that the abnormality occurs on a display device as abnormality occurrence information when the abnormality detection section determines that the abnormality occurs.

BACKGROUND

Japanese unexamined patent application publication No. 2003-72910 (Patent Document 1) discloses an example of the article transfer system noted above. In this article transfer system, the abnormality in the article transporting device or a target point to which the article is transferred by the article transporting device is detected at the abnormality detecting sensor. When the abnormality determination section determines that any abnormality occurs in the article transporting device or a target point to which the article is transferred by the article transporting device based on based on detecting information received from the abnormality detecting sensor, information indicating that the abnormality occurs in the article transporting device or a target point to which the article is transferred by the article transporting device is displayed on the display device as the abnormality occurrence information, thereby to notify the operator of the abnormality. As noted above, in the article transfer system of this type, the abnormality of the article transporting device or a target point to which the article is transferred by the article transporting device is detected at the abnormality detecting sensor. However, the abnormality detecting sensor may erroneously detect the abnormality due to a mechanical failure or an installment error of the abnormality detecting sensor even if no abnormality actually occurs in the article transporting device or a target point to which the article is transferred by the article transporting device, and the abnormality determination section may determine that the abnormality occurs in response to the erroneous detection.

The article transfer system disclosed in Patent Document 1 is designed to only notify the operator, even in the above-noted case, that the abnormality occurs by displaying the information on the display device indicating that the abnormality occurs in the article transporting device or a target point to which the article is transferred by the article transporting device as the abnormality occurrence information. Hence, the operator for using or supervising the article transfer system tends to realize less easily that the abnormality occurs in the abnormality detecting sensor, which may require a lot of time for adopting measures against the abnormality.

SUMMARY OF INVENTION

Having regard to the above-noted background, it is desired to provide an article transfer device that allows the operator to easily realize that abnormality occurs in an abnormality detecting sensor to promptly perform remedial work for the abnormality.

According to one aspect of the present invention, such an article transfer device comprises an article transporting device for transporting an article, an abnormality detecting sensor for detecting abnormality of the article transporting device or a target point to which the article is transferred by the article transporting device, an abnormality determination section for determining whether or not any abnormality occurs based on detecting information received from the abnormality detecting sensor, an input device for receiving input of a result of determination by the operator on whether or not the abnormality indicated by abnormality occurrence information displayed on a display device occurs, and a display control section for displaying information indicating that the abnormality occurs on the display device as the abnormality occurrence information when the abnormality detection section determines that the abnormality occurs, in which the display control section is adapted to display information indicating that the detecting information received from the abnormality detecting sensor is incorrect on the display device when the operator inputs the result of determination through the input device that the abnormality indicated by the abnormality occurrence information does not occur with the abnormality detecting sensor detecting the abnormality.

In other words, when the operator inputs the result of determination through the input device that the abnormality indicated by the abnormality occurrence information does not occur with the abnormality detecting sensor detecting the abnormality, the information indicating that the detecting information received from the abnormality detecting sensor is incorrect is displayed on the display device.

More particularly, when the abnormality occurrence information is displayed on the display device, the operator determines that some abnormality occurs in the article transporting device or the target point to which the article is transferred by the article transporting device and checks the article transporting device or the target point to which the article is transferred by the article transporting device. When the abnormality indicated by the abnormality occurrence information has not occurred as a result of the operator's checking, the operator inputs through the input device that the abnormality indicated by the abnormality occurrence information does not occur. As a result, the information indicating that the detecting information received from the abnormality detecting sensor is incorrect is displayed on the display device.

As noted above, when the operator determines that the abnormality indicated by the abnormality occurrence information does not occur while the abnormality occurrence information is displayed on the display device, the operator may input the result of their determination. To be more specific, the information indicating erroneous detecting information is sometimes displayed since the abnormality detecting sensor fails to perform its original detecting function due to a mechanical failure or an installment error of the abnormality detecting sensor. The operator may easily notice that there is abnormality in the abnormality detecting sensor to promptly adopt measures against the abnormality.

BRIEF DESCRIPTION OF INVENTION

FIG. 1 is a plan view of an article transfer system;
FIG. 2 is a control block diagram;
FIG. 3 is an overall layout representation;
FIG. 4 shows a display of information on target point abnormality;
FIG. 5 shows a display of information for restoring the target point abnormality;

DETAILED DESCRIPTION OF INVENTION

Figure 1:
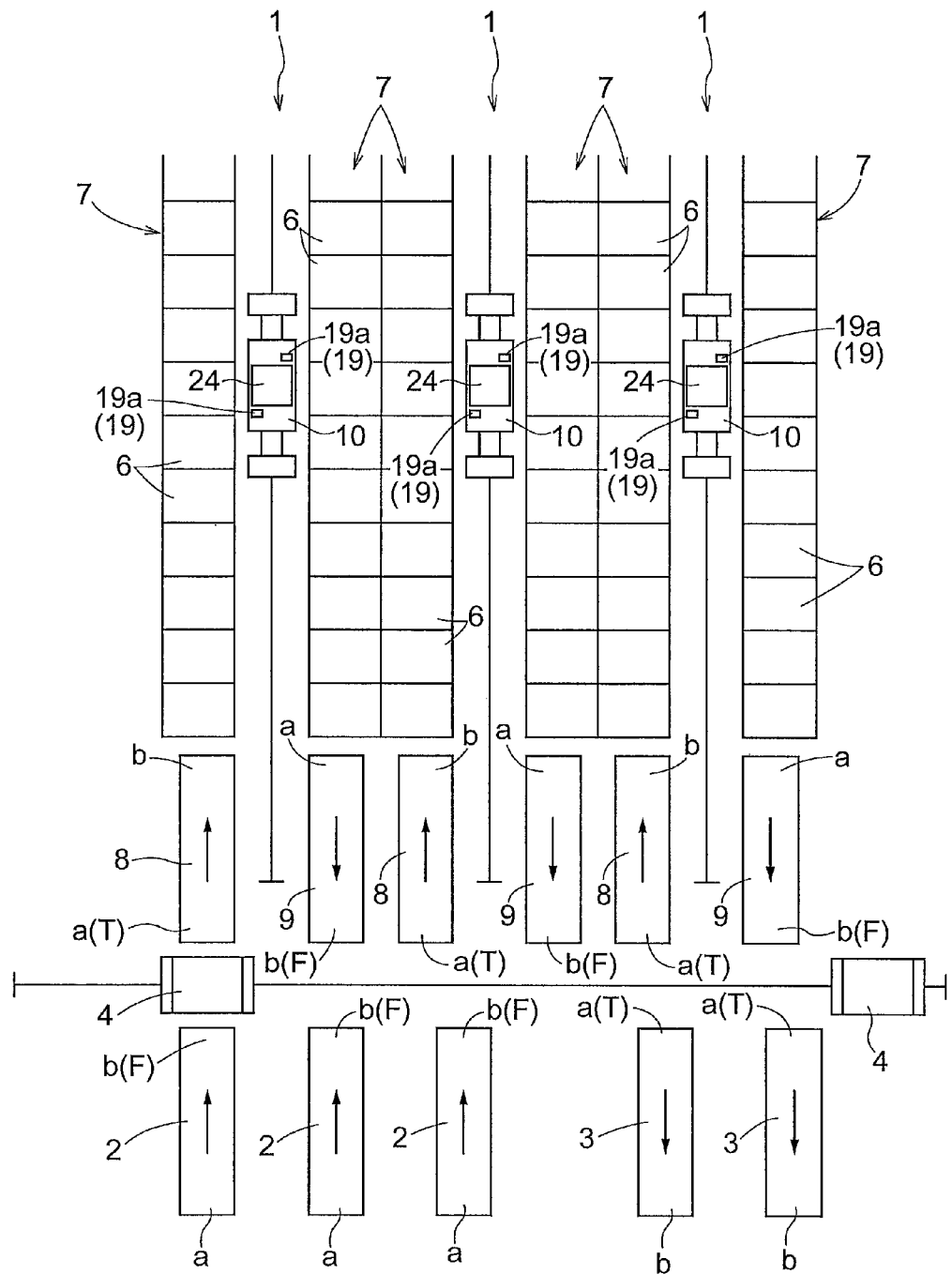

An embodiment of the present invention will be described hereinafter in reference to the accompanying drawings. As shown in FIG. 1, an article transfer system includes an automated warehouse 1 for storing an article, a carry-in conveyor 2 for transferring the article carried in from the outside, a carry-out conveyor 3 for transferring the article to be carried out to the outside, and an article transfer carriage 4 adapted to travel on a floor surface for transferring the article between the automated warehouse 1 and the carry-in conveyor 2 or carry-out conveyor 3.

The automated warehouse 1 is provided with an article storage shelf 7 having a plurality of storage portions 6 arranged vertically and horizontally for storing the article, a stock conveyor 8 for transferring the article to be stored in the automated warehouse 1, a delivery conveyor 9 for transferring the article to be delivered from the automated warehouse 1, and a stacker crane 10 adapted to travel on the floor surface for transferring the article between the article storage shelf 7 and the stock conveyor 8 or the delivery conveyor 9. In the article transfer system including a plurality of transporting devices 11 such as the carry-in conveyor 2, carry-out conveyor 3, article transfer carriage 4, stock conveyor 8, delivery conveyor 9 and stacker crane 10 as noted above, the article is transferred in the following manner. It should be noted that a transfer direction in each conveyor is shown in arrow in FIG. 1. Here, the transporting devices 11 including the carry-in conveyor 2, carry-out conveyor 3, article transfer carriage 4, stock conveyor 8, delivery conveyor 9 and stacker crane 10 correspond to article transporting devices for transferring the article, respectively.

For example, when the article carried in from the outside is stored in one of the storage portions 6 of the article storage shelf 7, the article carried in from the outside is placed on a transfer upstream end portion "a" of the carry-in conveyor 2. The article placed on the carry-in conveyor 2 is transported to a transfer downstream end portion "b" of the carry-in conveyor 2. The article transported to the transfer downstream end portion "b" of the carry-in conveyor 2 is transferred to the article transfer carriage 4. The article is transported to a transfer upstream end portion "a" of the stock conveyor 8 in the automated warehouse 1 by the article transfer carriage 4 and then transferred to the stock conveyor 8. The transferred article is transported to a transfer downstream end portion "b" of the stock conveyor 8. The article positioned in the transfer downstream end portion "b" of the stock conveyor 8 is scooped by the stacker crane 10. The scooped article is transported and transferred to one of the storage portions 6 of the article storage shelf 7 to be stored in the storage portion 6.

As noted above, when the article carried in from the outside is stored in one of the storage portions 6 of the article storage shelf 7, the article is consecutively delivered and transported from the carry-in conveyor 2, article transfer carriage 4, stock conveyor 8 and stacker crane 10 in the mentioned order.

On the other hand, when the article fetched out of one of the storage portions 6 of the article storage shelf 7 is carried out to the outside, the article fetched out of one of the storage portions 6 is transported to a transfer upstream end portion "a" of the delivery conveyor 9 by the stacker crane 10, and then to a transfer downstream end portion "b" of the delivery conveyor 9 on the delivery conveyor 9. The article positioned at the transfer downstream end portion "b" of the delivery conveyor 9 is placed on the article transfer carriage 4 and transported from the automated warehouse 1. The article transported from the automated warehouse 1 is transported to a transfer upstream end portion "a" of the carry-out conveyor 3 by the article transfer carriage 4 and transferred to the carry-out conveyor 3. The transferred article is transported to a transfer downstream end portion "b" of the carry-out conveyor 3 on the carry-out conveyor 3, and then carried out to the outside.

As noted above, when the article fetched out of one of the storage portions 6 of the article storage shelf 7 is carried out to the outside, the article is consecutively delivered and transported from the stacker crane 10, delivery conveyor 9, article transfer carriage 4 and carry-out conveyor 3 in the mentioned order.

The article transfer system includes abnormality detecting sensors 19 for detecting abnormality of the transporting devices (article transporting devices) 11 or a point to which the article is transferred. The abnormality detecting sensors 19, which are provided in the stacker crane 10, for example, include an article presence detecting sensor 19a (see FIG. 1) for detecting whether or not the article is present in the target storage portion 6, a projection detecting sensor (not shown) for detecting whether or not the article transferred on a transfer device 24 is placed at a proper position, a height detecting sensor (not shown) for detecting whether or not the height of the article transferred on the transfer device 24 is smaller than a predetermined height, and a chain detecting sensor (not shown) for detecting extension or breakage of a chain for supportingly suspending a raising/lowering carriage.

Here, the article presence detecting sensor 19a corresponds to the abnormality detecting sensor 19 for detecting abnormality of a point to which the stacker crane 10 (transporting device 11) transfers the article. The remaining sensors correspond to the abnormality detecting sensors 19 for detecting abnormality of the stacker crane 10 (transporting device 11). It should be noted that, in the current embodiment, the point to which the stacker crane 10 transfers the article represents the storage portion 6, the transfer downstream end portion "b" of the stock conveyor 8 or the transfer upstream end portion "a" of the delivery conveyor 9.

[Control of the Article Transfer System]

Figure 2:
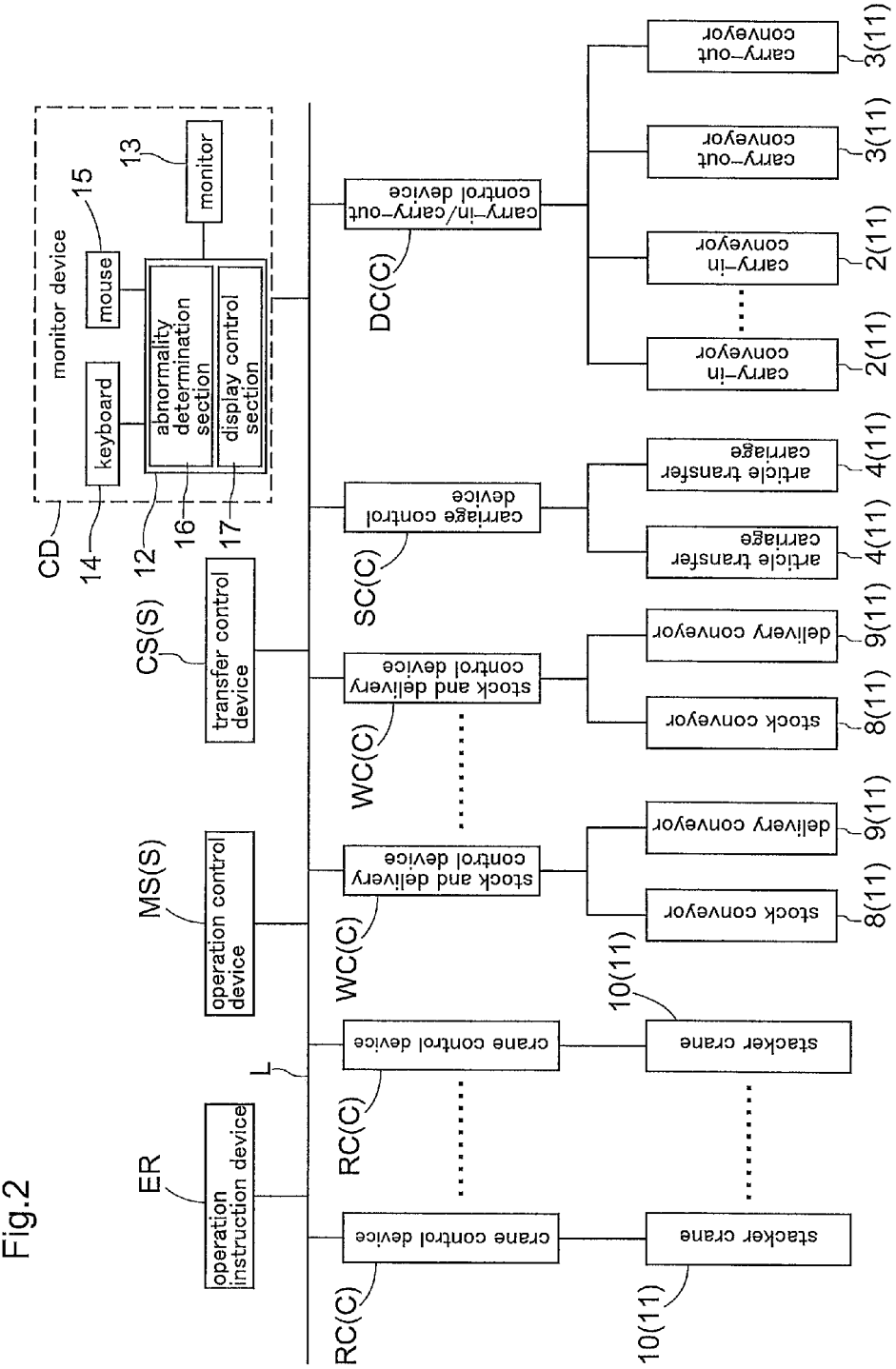

As shown in FIG. 2, the article transfer system includes a management unit S for managing article storage information representing information of the article stored in the automated warehouse 1 and managing transfer instruction information on the article carried in the article transfer system and the article carried out from the article transfer system, an operation instruction device ER for transmitting carry-in instruction information of the article and carry-out instruction information of the article to the management unit S based on a carry-in request or a carry-out request inputted from an unillustrated control terminal, a control unit C for controlling operation of the transporting devices 11 based on the transfer instruction information received from the management unit S, and a monitor device CD for displaying a condition of the article transfer system in response to a request of the operator.

The management unit S includes an operation control device MS acting as an operation control section and a transfer control device CS acting as a transfer control section. The operation control device MS is adapted to produce the transfer instruction information based on the carry-in instruction information and the carry-out instruction information received from the operation instruction device ER. The transfer control device CS is adapted to select a device of the control unit C to which the transfer instruction information is transmitted based on the transfer instruction information, and transmit the transfer instruction information to the target device of the control unit C.

The control unit C includes a crane control device RC, a stock and delivery control device WC, a carriage control device SC acting as a transfer control device, and a carry-in/carry-out control device DC. The crane control device RC is adapted to control operation of the stacker crane 10 as the control unit C based on the transfer instruction information received from the transfer control device CS. The stock and delivery control device WC is adapted to control operation of the stock conveyor 8 and the delivery conveyor 9 based on the transfer instruction information received from the transfer control device CS. The carriage control device SC is adapted to control operation of the article transfer carriage 4 based on the transfer instruction information received from the transfer control device CS. The carry-in/carry-out control device DC is adapted to control operation of the carry-in conveyor 2 and the carry-out conveyor 3 based on the transfer instruction information received from the transfer control device CS. Incidentally, according to the current embodiment, three crane control devices RC are provided which is the same number as the stacker cranes 10, the stock and delivery control device WC is provided per unit of the automated warehouse 1 and thus three stock and delivery control devices WC are provided which is the same number as the automated warehouses 1, one carriage control device SC is provided, and one carry-in/carry-out control device DC is provided.

In the current embodiment, the operation instruction device ER, operation control device MS, transfer control device CS, monitor device CD, crane control devices RC, stock and delivery control devices WC, carriage control device SC and carry-in/carry-out control device DC are connected through a communication line L to receive and transmit the information therebetween.

An additional explanation on the operation control device MS will be given hereinafter. When the carry-in instruction information or carry-out instruction information is transmitted from the operation instruction device ER, the operation control device MS produces the transfer instruction information in reference to the transmitted instruction information and article storage information. Here, the carry-in instruction information includes information indicating the carry-in conveyor 2 to which the article is carried in and article information (information indicating the name of the article and the number of articles). The carry-out instruction information includes information indicating the carry-out conveyor 3 to which the article is carried out and article information. Further, the carry-out instruction information includes information indicating a transfer staring point, information indicating a transfer finishing point, and article information.

More particularly, when receiving the carry-in instruction information from the operation instruction device ER, the operation control device MS is adapted to designate the carry-in conveyor 2 (transfer upstream end portion "a" of the carry-in conveyor 2) for receiving the article as the transfer staring point based on the carry-in instruction information, designate the storage portion 6 for storing the carried-in article as the transfer finishing point in reference to the carry-in instruction information to produce the transfer instruction information and then transmit the transfer instruction information to the transfer control device CS. On the other hand, when receiving the carry-out instruction information from the operation instruction device ER, the operation control device MS is adapted to designate one of the storage portions 6 storing the article to be carried out as the transfer starting point, designate the carry-out conveyor 3 (transfer downstream end portion of the carry-out conveyor 3) for carrying out the article as the transfer finishing point to produce the transfer instruction information and then transmit the transfer instruction information to the transfer control device CS.

Next, an additional explanation on the transfer control device CS will be given. When the transfer instruction information is transmitted from the operation control device MS, the transfer control device CS is adapted to select a device of the control unit C for receiving the transfer instruction information based on the information indicating the transfer starting point and information indicating the transfer finishing point included in the transfer instruction information, and then transmit the transfer instruction information to the selected device of the control unit C.

An additional explanation on the monitor device CD will be given hereinafter. The monitor device CD includes a computer 12, a monitor 13 acting as a display device, and a keyboard 14 and a mouse 15 acting as an input device. Further, the monitor device CD is adapted to receive the transfer instruction information that is the same as the transfer instruction information transmitted to the carriage control device SC. The computer 12 includes an abnormality determination section 16 and a display control section 17 acting as a functional section achieved by cooperation between hardware and software such as a program. The abnormality determination section 16 is a functional section for determining whether or not any abnormality occurs based on detecting information of the abnormality detecting sensors 19. The display control section 17 is a functional section for displaying a warning that abnormality occurs on the monitor 13 when the abnormality determination section 16 determines that the abnormality occurs.

A specific example on the determination by the abnormality determination section 16 whether or not any abnormality occurs will be described hereinafter. When the transfer of the article is started from the transfer device 24 of the stacker crane 10 to one of the storage portion 6, for example, if the presence of the article in that storage portion 6 is detected by the article presence sensor 19a, the abnormality determination section 16 determines that abnormality occurs in the transfer target point (storage portion 6) of the stacker crane 10 (double-storage abnormality). On the other hand, when the transfer of the article is started from the transfer device 24 of the stacker crane 10 to one of the storage portions 6, if the presence of the article in that storage portion 6 is not detected by the article presence sensor 19a, the abnormality determination section 16 determines that there is no abnormality in the transfer target point (storage portion 6) of the stacker crane 10

When determining that any abnormality occurs, the abnormality determination section 16 selects one of abnormality codes (corresponding to abnormality occurrence information) associated with the abnormality. Different abnormality codes are provided depending on the types of the abnormality. The abnormality determination section 16 stores the abnormality information indicating the types of abnormality corresponding to the plurality of abnormality codes.

Figure 3:
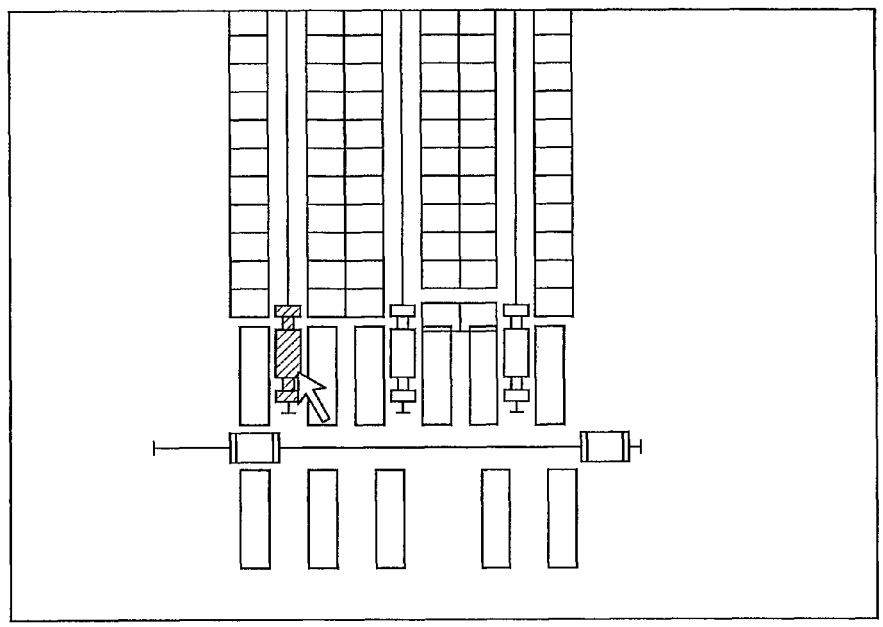

Display information displayed on the monitor 13 through the display control section 17 will be described hereinafter. As shown in FIG. 3, an overall layout is displayed on an initial screen for showing an entire arrangement of the article transfer system. Displayed positions of symbols representing the stacker came 10 and the article transfer carriage 4 are updated in real time in response to actual positions of the stacker crane 10 and the article transfer carriage 4 in the article transfer system.

When one of the abnormality codes is selected at the abnormality determination section 16, a symbol indicating the transporting device 11 that is determined as normal and a symbol indicating the transporting device 11 that is determined as not normal are different from each other in way of display in the overall layout. The transporting device 11 that is determined as not normal means the transporting device 11 that is determined as abnormal based on any of the abnormality codes or the transporting device 11 corresponding to the target transfer point that is determined as abnormal. The symbol indicating such a transporting device 11 that is determined as not normal is displayed in a different way from the remaining transporting devices 11 that are determined as normal. More specifically, as shown in FIG. 3, of three symbols indicating the stacker cranes 10, the symbol for the left stacker crane 10 that is determined as abnormal is displayed in an abnormality displaying mode (with hatching in this example), while the symbols for the middle and right stacker cranes 10 that are determined as normal are displayed in a normal displaying mode (without hatching in this example).

Figure 4:
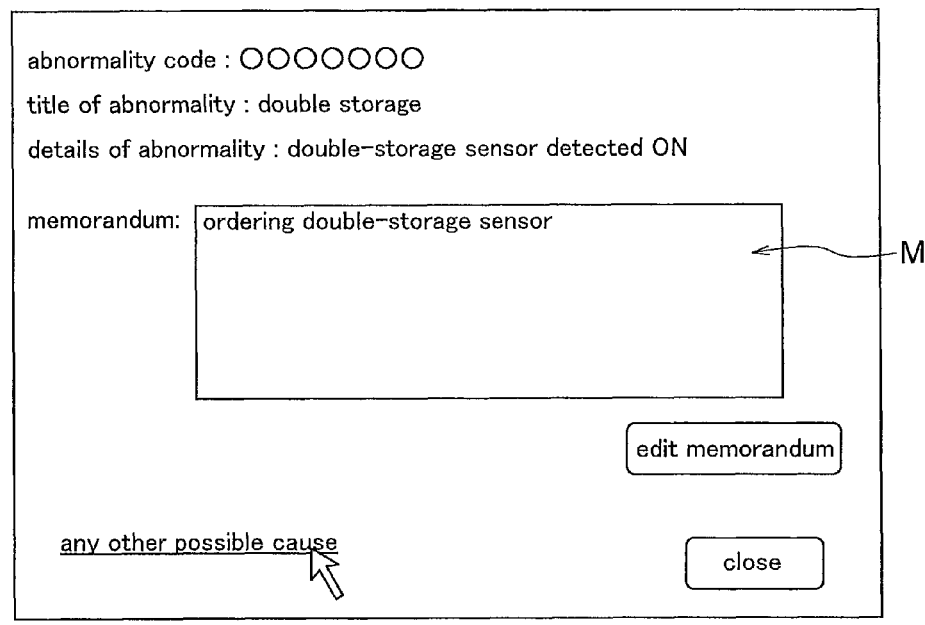

In this state, when the operator double-clicks the symbol indicating the transporting device 11 that is displayed in the abnormality displaying mode in the overall layout using the mouse 15, a pop-up window as shown in FIG. 4 appears. This window represents a display of information on target point abnormality for displaying details of the abnormality corresponding to the abnormality code. FIG. 4 shows the display of information on target point abnormality indicating double-storage abnormality.

The display of information on target point abnormality includes the abnormality code, a title of abnormality, the details of abnormality, and a memorandum. The warning that the abnormality occurs is displayed on the monitor 13 as the abnormality code when the abnormality determination section 16 determines that the abnormality occurs. The title of the abnormality and details of the abnormality as well as a cause, action to be taken and an image that will be described later are displayed based on the abnormality information stored in the abnormality determination section 16.

The operator may use a memorandum space M in the display of information on target point abnormality for freely entering a character or characters. The display control section 17 is adapted to store the entered character and a character string formed of a plurality of characters entered. More particularly, the operator may click a portion of the memorandum space M in which the character or character string is entered using the mouse 15 and then enter the character or character string for information associated with the abnormality using the keyboard 14. The operator may successively click "memorandum editing" on the display using the mouse 15 to allow the character or character string entered in the memorandum space M to be stored.

To be more specific, the mouse 15 and keyboard 14 correspond to the input device for inputting the information associated with the abnormality code as textual information, and the display control section 17 is adapted to associate the textual information inputted through the mouse 15 and keyboard 14 with the abnormality code as shared textual information to be stored. Thus, even after the operator clicks "close" on the display with the mouse 15 to close the window for the display of information on target point abnormality, it is possible to display the shared textual information that has been stored on the memorandum space M on the monitor 13 in association with the abnormality code when the display of information on target point abnormality is given again.

For instance, when the operator is in process of ordering a new abnormality detecting sensor 19 for replacement or when a remedy for the abnormality indicated in the abnormality occurrence information has yet to be completed (in the middle course of the remedy), they may input the progress of the action or remedy that has been taken as the shared textual information through the mouse 15 and keyboard 14. Since such shared textual information can prevent any other operator from doubly proceeding to order the abnormality detecting sensor 19 or performing the remedial work, the remedial work against the abnormality can effectively proceed.

Figure 5:
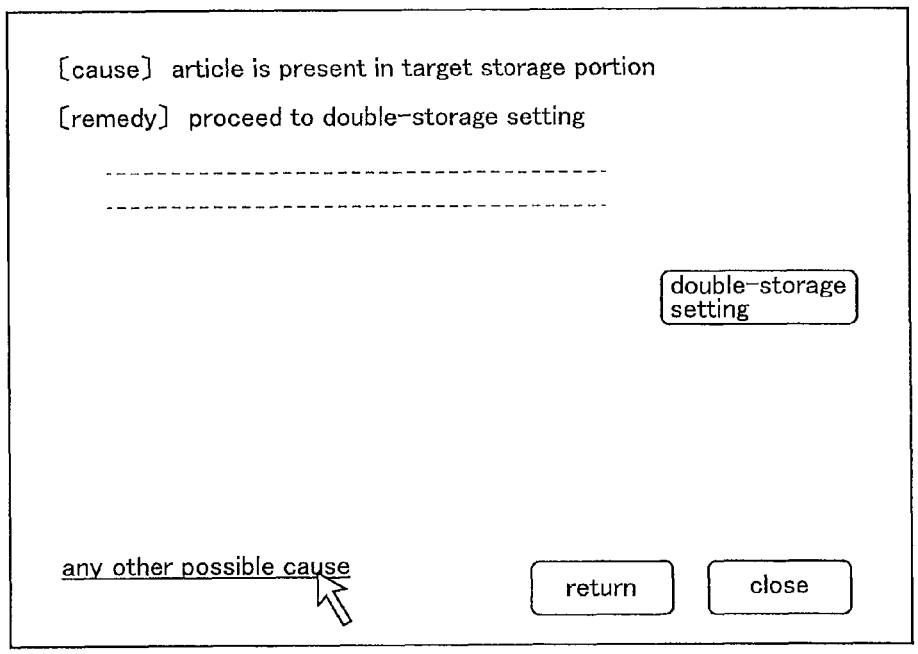

Incidentally, a character string of "start restoration guidance" is indicated on the display of information on target point abnormality. When the operator clicks this character string with the mouse 15, a pop-up window for a display of information for restoring the target point as shown in FIG. 5 appears. FIG. 5 shows the display of information for restoring the target point in the case of "double-storage abnormality."

The above-noted display of information for restoring the target point includes indications of "cause" and "remedy" corresponding to the abnormality code. The indication of "cause" includes a cause leading to the abnormality in the target point having the abnormality detected by the abnormality detecting sensor 19. In the similar manner, the indication of "remedy" includes a way of eliminating the cause in the detected target point. It should be noted that the cause, title of the abnormality, details of the abnormality and details of the memorandum are displayed based on the abnormality information stored in the abnormality determination section 16. As a result, the operator is able to eliminate the cause for the abnormality in the detected target point based on the information on the cause and the remedy indicated on the display of information for restoring the target point to restore the article transfer system from the abnormal state.

If the system cannot restore from the abnormal state because the abnormality has not occurred due to the cause indicated on the display of information for restoring the target point, the operator clicks a character string of "any other possible cause" indicated in the display of information for restoring the target point with the mouse 15. A pup-up window for a new display of information for restoring the target point appears for any other possible cause or remedy, if any. In other words, if there are several causes or remedies corresponding to the abnormality code, pup-up windows appear one after the other each for the display of information for restoring the target point indicating the cause and remedy.

Figure 6:
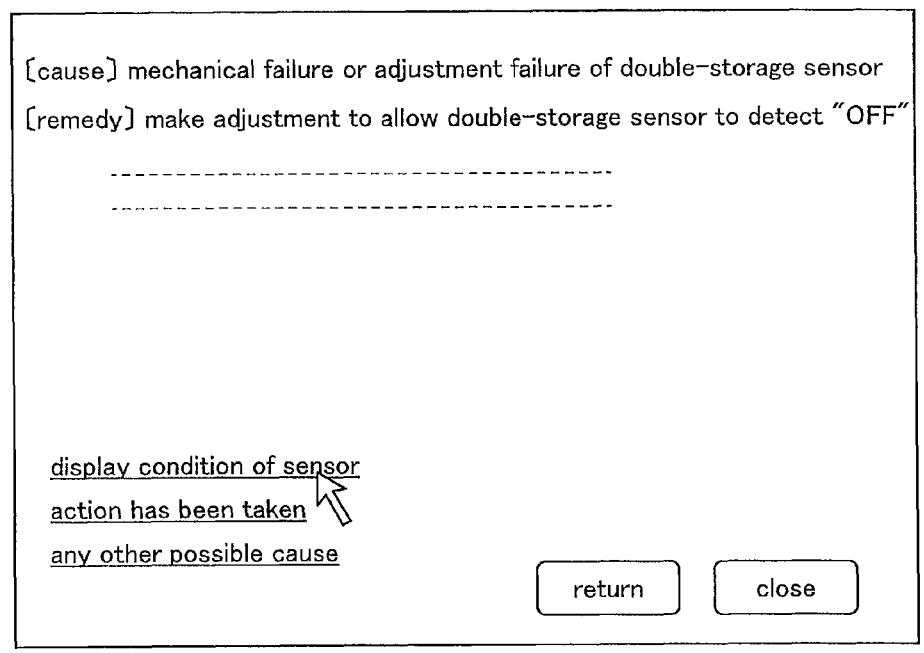
FIG. 6 shows a display of information for restoring a sensor.

If all the candidate displays of information for restoring the target point are provided and there remains no other cause or remedy corresponding to the abnormality code, a pup-up window appears for a display of information for restoring the sensor indicating the abnormality in the abnormality detecting sensor 19. FIG. 6 shows the display of information for restoring the sensor in the case of the double-storage abnormality.

The above-noted display of information for restoring the sensor includes indications of "cause" and "remedy" each corresponding to the abnormality code. The indication of "cause" includes a cause leading to the abnormality in the abnormality detecting sensor 19. In the similar manner, the indication of "remedy" includes a way of eliminating the cause in the abnormality detecting sensor 19. As a result, the operator is able to eliminate the cause for the abnormality in the detected target point based on the information on the cause and the remedy indicated on the display of information for restoring the sensor to restore the article transfer system from the abnormal state.

Figure 7:
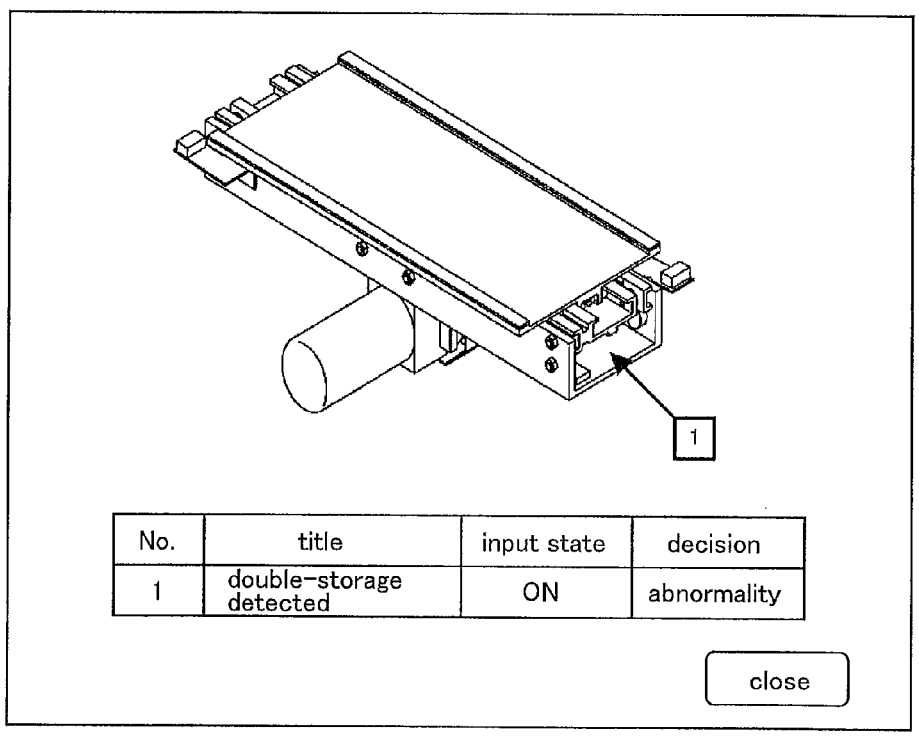
FIG. 7 shows a display of detailed information of the sensor.

A character string of "display the condition of the sensor" is indicated on the display of information for restoring the sensor. When the operator clicks this character string with the mouse 15, a pop-up window as shown in FIG. 7 appears including detailed information for the sensor. FIG. 7 shows the display of the detailed information for the sensor in the case of double-storage abnormality.

In the display of detailed information for the sensor, information on a detecting state of the abnormality detecting sensor 19 and information indicating that detecting information from the abnormality detecting sensor 19 is incorrect are displayed on the monitor 13 as well as image information. The image information includes an image that allows the operator to visually confirm a position where the abnormality detecting sensor 19 is mounted. More particularly, in the case of double-storage abnormality, the image includes a perspective view image of the transfer device 24 having the article presence detecting sensor 19a provided therein, an arrow indicating a portion of the transfer device 24 where the article presence detecting sensor 19a is provided and a sign (numeral in this example) assigned to the article presence detecting sensor 19a.

In the example of FIG. 7, on the monitor are displayed the assigned sign (numeral in this example) in the column of "No.," characters of "double-storage detected" in the column of "title," characters of "ON" in the column of "input state" to indicate the detecting state of the abnormality detecting sensor 19, and characters of "abnormal" in the column of "decision" to indicate that the detecting information of the abnormality detecting sensor 19 is incorrect. Those columns are highlighted in red, for example. If the problem of double-storage abnormality is solved, on the monitor are displayed characters of "double-storage detected" in the column of "title," characters of "OFF" in the column of "input state" to indicate the detecting state of the abnormality detecting sensor 19, and characters of "normal" in the column of "judgment" to indicate that the detecting information of the abnormality detecting sensor 19 is correct. In this case, those columns are not highlighted but indicated in white in a regular manner.

As noted above, before the operator inputs the information showing that no abnormality corresponding to the abnormality code occurs using the mouse 15 with the abnormality detecting sensor 19 detecting abnormality, the information for eliminating the abnormality corresponding to the abnormality code is displayed in the display of information for restoring the target point on the monitor 13. Then, when the operator inputs the information showing that no abnormality corresponding to the abnormality code occurs using the mouse 15, the information showing that the detecting information of the abnormality detecting sensor 19 is incorrect in the display of information for restoring the sensor on the monitor 13. Further, on the monitor 13 are displayed the information showing that the detecting information of the abnormality detecting sensor 19 is incorrect and the image allowing the operator to confirm the position where the abnormality detecting sensor 19 is mounted in the display of detailed information of the sensor.

In this manner, before the operator inputs the information showing that no abnormality corresponding to the abnormality code occurs through the mouse 15, they may eliminate the abnormality indicated by the abnormality code in view of the information displayed on the monitor 13. On the other hand, after the operator inputs the information showing that no abnormality corresponding to the abnormality code occurs through the mouse 15, they may make positional adjustment or replacement of the abnormality detecting sensor 19 in view of the information displayed on the monitor 13.

[Modified Embodiments]

[1] In the above-noted embodiment, the display control section 17 is adapted to display on the display device the information indicating that the detecting information of the abnormality detecting sensor is incorrect as well as the image that allows the operator to visually confirm the position where the abnormality detecting sensor is mounted. Instead, the display control section 17 may be adapted to display on the display device the information indicating that the detecting information of the abnormality detecting sensor is incorrect on one hand, not to display on the display device the image that allows the operator to visually confirm the position where the abnormality detecting sensor is mounted on the other hand.

[2] In the above-noted embodiment, the display control section 17 is adapted to display on the display device the abnormality occurrence information showing that any abnormality occurs and the information for eliminating the abnormality indicated by the abnormality occurrence information. Instead, the display control section 17 may be adapted to display on the display device the abnormality occurrence information showing that any abnormality occurs on one hand, not to display the information for eliminating the abnormality indicated by the abnormality occurrence information on the display device on the other hand.

[3] In the above-noted embodiment, the display control section 17 is adapted to display the shared textual information associated with the abnormality occurrence information on the display device. Instead, the display control section 17 may be adapted not to display the shared textual information on the display device. In that case, the input device is dispensable for inputting the information associated with the abnormality indicated by the abnormality occurrence information as the textual information.

LIST OF REFERENCE SIGNS 2 carry-in conveyor (article transporting device)
3 carry-out conveyor (article transporting device)
4 article transfer carriage (article transporting device)
8 stock conveyor (article transporting device)
9 delivery conveyor (article transporting device)
10 stacker crane (article transporting device)
11 transporting device (article transporting device)
13 monitor (display device)
14 keyboard (input device)
15 mouse (input device)
16 abnormality determination section
17 display control section
19 abnormality detecting sensor
19a article presence sensor (abnormality detecting sensor)

What is claimed is:
1. An article transfer system comprising:
an article transporting device for transporting an article;
an abnormality detecting sensor for detecting abnormality of the article transporting device or a target point to which the article is transferred by the article transporting device;
an abnormality determination section for determining whether or not any abnormality occurs based on detecting information received from the abnormality detecting sensor;
an input device for receiving input of a result of determination by the operator on whether or not the abnormality indicated by abnormality occurrence information displayed on a display device occurs; and
a display control section for displaying information indicating that the abnormality occurs on the display device as the abnormality occurrence information when the abnormality detection section determines that the abnormality occurs, the display control section displaying information indicating that the detecting information received from the abnormality detecting sensor is incorrect on the display device when the operator inputs the result of determination through the input device that the abnormality indicated by the abnormality occurrence information does not occur with the abnormality detecting sensor detecting the abnormality.

2. The article transfer system as defined in claim 1, wherein the display control section displays on the display device an image allowing the operator to visually confirm a position where the abnormality detecting sensor is mounted along with the information indicating that the detecting information received from the abnormality detecting sensor is incorrect when the operator inputs the result of determination through the input device that the abnormality indicated by the abnormality occurrence information does not occur with the abnormality detecting sensor detecting the abnormality.

3. The article transfer system as defined in claim 1, wherein the display control section displays information for eliminating the abnormality indicated by the abnormality occurrence information on the display device when the abnormality detecting sensor detects the abnormality and before the operator inputs the result of determination through the input device that the abnormality indicated by the abnormality occurrence information does not occur.

4. The article transfer system as defined in claim 2, wherein the display control section displays information for eliminating the abnormality indicated by the abnormality occurrence information on the display device when the abnormality detecting sensor detects the abnormality and before the operator inputs the result of determination through the input device that the abnormality indicated by the abnormality occurrence information does not occur.

5. The article transfer system as defined in claim 1, wherein the input device is used to input information relating to the abnormality indicated by the abnormality occurrence information as textual information, and
wherein the display control section stores the textual information inputted through the input device as associated with the abnormality occurrence information as shared textual information, and display the shared textual information that has been stored as related with the abnormality occurrence information.

6. The article transfer system as defined in claim 2, wherein the input device is used to input information relating to the abnormality indicated by the abnormality occurrence information as textual information, and
wherein the display control section stores the textual information inputted through the input device as associated with the abnormality occurrence information as shared textual information, and display the shared textual information that has been stored as related with the abnormality occurrence information.

7. The article transfer system as defined in claim 3, wherein the input device is used to input information relating to the abnormality indicated by the abnormality occurrence information as textual information, and
wherein the display control section stores the textual information inputted through the input device as associated with the abnormality occurrence information as shared textual information, and display the shared textual information that has been stored as related with the abnormality occurrence information.

8. The article transfer system as defined in claim 4, wherein the input device is used to input information relating to the abnormality indicated by the abnormality occurrence information as textual information, and
wherein the display control section stores the textual information inputted through the input device as associated with the abnormality occurrence information as shared textual information, and display the shared textual information that has been stored as related with the abnormality occurrence information.

* * * * *